2,734,037

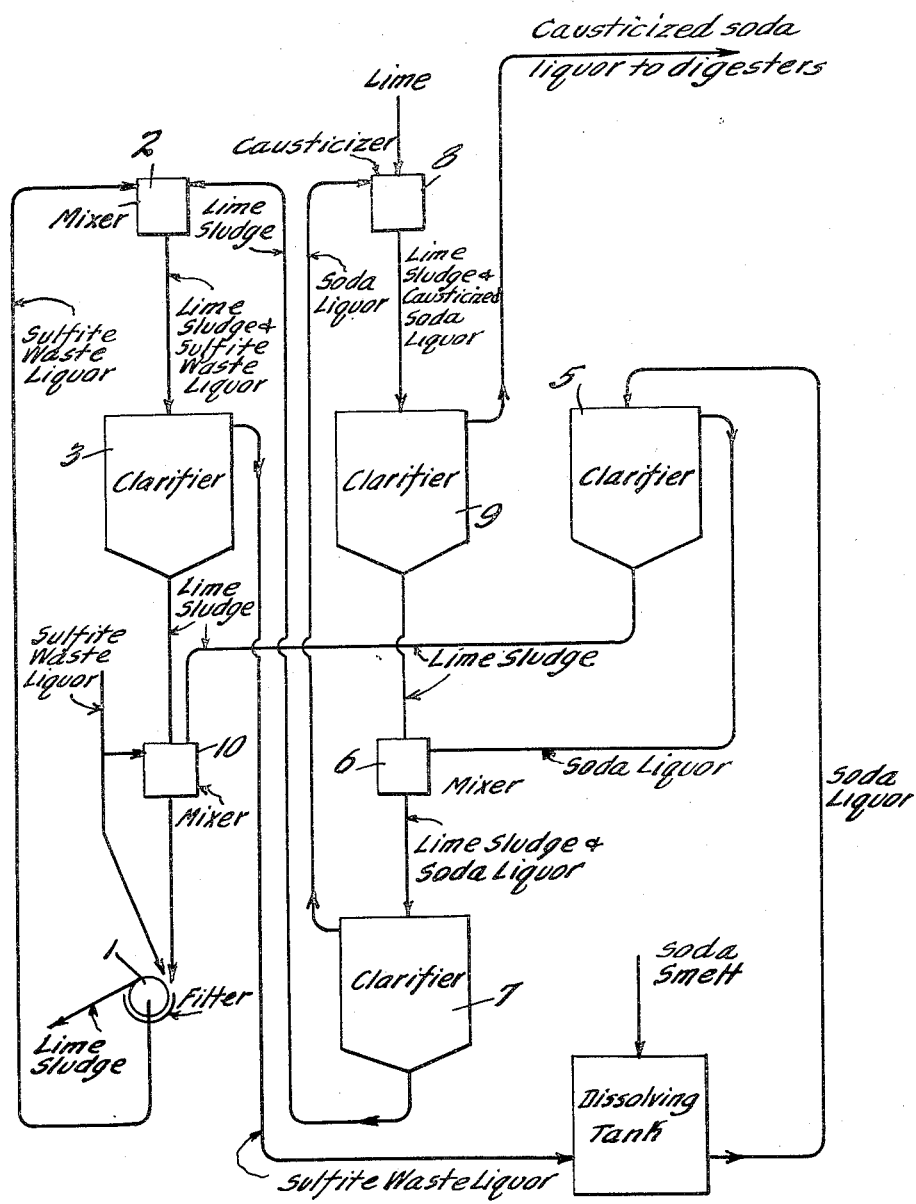

METHOD OF INTRODUCING SULFITE WASTE LIQUOR INTO THE ALKALI RECOVERY PROCESS IN THE MANUFACTURE OF ALKALINE CELLULOSE

Nils Viktor Mannbro, Fredriksberg, Sweden

Application July 11, 1951, Serial No. 236,287

Claims priority, application Sweden August 17, 1950

4 Claims. (Cl. 252—183)

The present invention relates to cellulose manufacture, particularly to a process of preparing cooking liquor for alkaline cellulose manufacture wherein sulfite waste liquor is employed for dissolving the soda smelt obtained in the alkali recovery process of the alkaline cellulose plant.

It has been proposed to make use of sulfite waste liquor containing either sodium or calcium as the base by employing it for dissolving the smelt soda obtained in the regeneration of alkali in the sulfate cellulose process or in other processes of preparing cellulose wherein the digestion of the cellulosic raw-material, usually wood, is carried out with causticized, sulfide-containing soda liquors. The resulting solution of smelt soda in sulfite waste liquor is causticized and is employed in the conventional manner for cellulose digestion. The black liquor obtained in these cooks will thus contain the solids which were present in the sulfite waste liquor in addition to the wood substance that is dissolved in the alkaline digestion, which results in a higher solid content of the black liquor and in increased amount of heat evolved in the combustion thereof, as compared to conventional operation. Furthermore the sulfite waste liquor will in this manner be evaporated without any steam consumption. In such alkaline cellulose manufacture wherein the loss of alkali is covered with soda or sodium hydroxide it is furthermore in certain cases desirable to introduce sulfur or sulfur-containing compounds into the process. This result is automatically obtained when sulfite waste liquor is employed in the above-mentioned manner.

It is known that settlement of the lime-sludge obtained by causticizing a solution of smelt soda in sulfite waste liquor may be carried through even when calcium-containing sulfite waste liquors are used, if the calcium precipitate formed when the smelt soda is added and containing susbtantially calcium carbonate, is removed prior to causticization or, preferably, if the calcium content of the waste liquor is removed already prior to passing the liquor to the soda dissolving tanks. Even after addition of the total amount of smelt soda required for the preparation of the soda liquor the calcium precipitate formed settles slowly, but if it is not removed before causticization the settling of the lime-sludge obtained in this step is retarded to the point where it is almost impossible to carry out in practice. In those cases, however, where the soda liquor is clarified before causticization the precipitation of the calcium present in the sulfite waste liquor may be allowed to take place in the soda dissolving tank. The rate of settling of the lime sludge may be increased in normal liquor preparation by adding soluble magnesium salts to the soda liquor in accordance with methods known per se, and clarifying before causticization. As the limestone used in the preparation of the calcium sulfite cooking acid most often contains more or less magnesium, which is present in the sulfite waste liquor this advantageous effect may be obtained without addition of soluble magnesium salts.

In order that the above mentioned process of preparing alkaline cooking liquor from sulfite waste liquor may be carried out most economically, the sulfite waste liquor must, however, replace the hot water normally used for washing the lime-sludge obtained in the causticization and the subsequent settling. Investigations have proved that the washing of the lime-sludge with sulfite waste liquor gives rise to considerable difficulties, due to the fact that the settling of the lime sludge in the sulfite waste liquor is very slow, regardless of whether the waste liquor is calcium-free, acidic or neutralised with lime-sludge or smelt soda.

The main object of the present invention is to eliminate the difficulties encountered when washing the lime-sludge obtained in a process, wherein sulfite waste liquor is employed in the above-mentioned manner, with sulfite waste liquor by providing a method of treating the lime-sludge so as to render it more easy to settle and to filter. Other objects of the invention will be apparent as the description proceeds.

Experiments have proved that preliminary treatment of the liquor has no decisive effect upon the rate of settling of the lime-sludge but instead the lime-sludge has to be treated. The lime-sludge obtained by causticizing a solution of smelt soda in sulfite waste liquor, is dark and slimy, but it has been found that when such lime-sludge is made into a suspension with the uncausticized soda liquor, its color becomes normal and it obtains a coarser particle-size. One reason for favorable change is of course that any $Ca(OH)_2$ of the lime-sludge is subjected to reaction with the sodium carbonate to form calcium carbonate. It may also be assumed that co-precipitated organic matter is removed from the sludge or the sludge is subjected to changes of a colloid chemical nature. Regardless of the type of causticizing equipment, the nature of the sulfite waste liquor or its preliminary treatment, treatment of the lime-sludge with a solution of smelt soda in sulfite-waste liquor will be necessary in order to obtain a lime-sludge, that settles rapidly and is easy to filter. Experiments have furthermore proved that a small excess of sodium carbonate in the weak liquor in the lime-sludge washing operation is necessary in order to obtain a satisfactory settling.

In accordance with this discovery the process of the present invention for preparing alkaline cooking liquor from sulfite waste liquor comprises the steps of treating the lime-sludge obtained by causticizing soda liquor prepared by dissolving smelt soda in sulfite waste liquor, with uncausticized soda liquor and washing the treated lime-sludge with fresh sulfite waste liquor which is thereupon used for dissolving a further quantity of soda smelt.

The process of the present invention may be carried into practice in a number of different ways depending upon the type of equipment used for preparing the alkaline cooking liquor and whether the operation is carried out continuously or intermittently. These various embodiments of the invention will be described below.

In intermittent causticization in tanks it may be suitable to suspend the thickened lime-sludge in the solution of smelt soda in the causticization tanks. The quantity of smelt soda solution required for this purpose may be about 10 to 35% of the volume of the causticizing tank and depends upon the excess of lime after the causticizing operation and upon the nature of the sulfite waste liquor that is thereupon introduced into the tank under continued agitation. The added sulfite waste liquor should to the largest extent possible have been used in the final washing of the lime-sludge upon a filter but may otherwise be of varying nature, such as fermented, acidic, or neutralized with lime-sludge or solution of smelt soda. It should be observed, however, that if calcium sulfite waste liquor the calcium content whereof has not been previously precipitated, is introduced into the causticizing tank, the previous addition of smelt soda solution should have been so great as to secure that sufficient sodium carbonate is present to completely precipitate the calcium as calcium carbonate. As is well known, the calcium present in the form of calcium lignosulfonate is also precipitated and is replaced by sodium.

As examples of settling times obtained in intermittent causticization the following results obtained in experiments with undiluted sulfite waste liquor containing 13.5% solids, may be mentioned. After causticization to a causticization degree of 79% of a liquor produced by dissolving smelt soda in the sulfite waste liquor and containing 180 grams smelt soda per liter the lime-sludge settled in the causticization tank in 60 minutes. When the degree of causticization was increased to 85% the settling time was doubled. After decantation of the causticized and clarified liquor a solution of smelt soda in the sulfite waste liquor corresponding to one third of the volume of the tank was added and was allowed to react with the lime-sludge before the tank was filled with sulfite waste liquor that had previously been neutralized with lime-sludge. The settling of the sludge in the weak liquor obtained, was effected in 20 and 45 minutes respectively. The favorable results may in part be explained by the fact that the smelt soda was obtained in a modern soda house equipment of the injection type and that the quicklime was of a good quality.

In all the experiments the temperature of the liquor was 90° C. The weak liquor obtained by washing the lime-sludge with sulfite waste liquor may be maintained at this temperature by using hot sulfite waste liquor which has not been subjected to heat-exchange. In order that the high temperature of the weak liquor shall not cause boiling when the soda smelt is dissolved therein, it should either be cooled in heat exchanging equipment before being supplied to the soda dissolving tank or a cooling coil may be provided in the dissolving tank.

Intermittent causticization according to the system described above has, however, certain disadvantages. The amount of sulfite waste liquor added for the treatment of the lime-sludge prevents the addition of a corresponding volume of fresh sulfite waste liquor. To obtain the quantity of liquid required in the causticization system for the preparation of the liquor, additional liquid has to be supplied from another source for instance by preparing additional weak liquor mixtures or by adding water to the weak liquor, that is supplied to the dissolving tank.

If the process is to be carried out in existing plants equipped for intermittent causticization and which are already exploited to the extent they do not admit sufficient time margin for additional weak liquor mixtures, the installation of a continuous weak liquor clarifier common to all the causticizing tanks may be a solution of the problem. The treatment of the lime-sludge with the solution of soda smelt will then be carried out in the causticizing tank, whereupon the reaction mixture after a short agitation period is supplied to a buffer tank, from which the suspension of the lime-sludge is continuously introduced into an agitating vessel where admixture of sulfite waste liquor takes place. The mixture of weak liquor and lime sludge is thereupon supplied to the clarifier where the lime-sludge and the lime precipitate derived from the sulfite waste liquor settle. The clarified weak liquor is passed to the soda dissolving tank. The lime-sludge from the clarifier is suspended in sulfite waste liquor, preferably acidic liquor and is filtered on a continuous washing filter or removed in a centrifuge. The filtrate obtained in the lime-sludge filter is used for suspending lime-sludge in the agitating vessel before the clarifier.

Modern systems for causticizing and settling and filtering of the lime-sludge comprise centrifugal separators. By means of such apparatus impurities and the precipitate obtained from calcium sulfite waste liquor, if such liquor is used, may be separated from the soda liquor, which facilitates the subsequent settling and filtering of the lime-sludge. Lime-sludge suspended in sulfite waste liquor may be filtered in a so-called centrifugal filter, which on account of the fact that its operation is not affected by the quality of the lime-sludge or by variations in the operation, is particularly well suited for carrying out the process of the present invention. In this manner the liquor preparation process may be restricted to causticization and subsequent settling of the lime-sludge and treatment of the lime-sludge with uncausticized soda liquor. This treatment of the lime-sludge may be carried out simply by suspending the lime-sludge in the soda dissolving tanks.

Of course such systems may be used, wherein settling tanks or liquor clarifiers are completely or in part replaced by separation or filtering in centrifugal apparatus.

Another possibility of carrying out the process of the invention is provided by the use of a continuous tray-belt filter. Such a filter comprises a number of trays the bottom of which is made from a filter medium connected to a vacuum source and arranged upon an endless belt. When this type of filter is used for the present process the mixture of lime-sludge and causticized liquor is introduced into the trays. The liquor is drained off by the vacuum and the sludge remains in the tray. Thereupon soda liquor is introduced into the tray and sucked through the filter. In this case this treatment also results in removal of impurities of the soda liquor and the precipitate obtained from the calcium sulfite waste liquor, which remain upon the coarse sludge. Thereupon sulfite waste liquor and a little amount of water are introduced into the tray for washing the lime-sludge. The waste liquor withdrawn from the filter is supplied to the soda dissolving tank.

In continuous causticization which is most suitable for carrying out the process of the invention it is usually preferable to treat the lime-sludge with the total quantity of the uncausticized smelt soda solution. The lime-sludge is after treatment with soda liquor washed with sulfite waste liquor, this washing takes place under conditions identical with those in intermittent causticization. If the washing is carried out with calcium sulfite waste liquor the lime-sludge should contain sufficient soda to precipitate the calcium. Thereupon the lime-sludge is washed upon a filter suspended in sulfite waste liquor. As washing liquid on the filter sulfite waste liquor and/or water may be employed.

When using a calcium sulfite waste liquor the calcium content of which has not been precipitated before the liquor is supplied to the washing apparatus for the lime-sludge, the calcium precipitate derived from the sulfite weak liquor will be discharged from the system together with the lime-sludge in continuous as well as discontinuous operation. When the lime-sludge is re-burnt and calcium sulfite waste liquor is used, the lime precipitate from the sulfite waste liquor may replace the quantity of lime-sludge that has to be discharged from the system before re-burning.

The consumption of soda smelt for precipitating the calcium and neutralizing the sulfite waste liquor and the somewhat increased alkali consumption in the cellulose cooking makes it necessary to circulate about 25 to 30% more alkali than normally in the sulfate cellulose plant, but the amount of alkali, based upon the same quantity of solids in the black liquor is not greater but rather less than in the normal sulfate cellulose process. When using sodium sulfite waste liquor there is initially sodium lignosulfonate in the sulfite waste liquor and alkali from the sulfate cellulose process has to be added for neutralizing purposes. It should also be observed that the sodium sulfite formed by the neutralization of the liquors has a favorable influence upon the cooking.

The great amounts of sulfur introduced into the sulfate cellulose process with the sulfite waste liquor, increases the content of sodium sulfide of the smelt soda; this sodium sulfide is an active substance in the sulfate cellulose digestion. This reduces the quantity of lime required for the causticization of the smelt soda solution. According to special processes, the excess of sulfur may be recovered as sulfur dioxide for use in the acid production of the sulfite plant. In this connection it becomes important to reduce the losses of sulfur in the sulfate cellulose plant, for instance by known methods involving oxidation of the black liquor, introduction of cooking relief gases in to the soda burner and washing of the flue gases therefrom with oxidized black liquor or other liquors that do not give rise to losses of hydrogen sulfide.

If the supply of sulfite waste liquod is greater than the amount required for preparing liquor for the alkaline cellulose process but it is yet desirable to take advantage of the content of dissolved wood substances and sulfur of the sulfite waste liquor in the alkaline process, the sulfite waste liquor may after suitable pre-treatment be admixed with the black liquor in order to be burnt together with the same. The previously known methods of utilizing the sulfite waste liquor in this manner required additional equipment for neutralization of the calcium waste liquor and precipitation of calcium. If instead the total available amount of sulfite waste liquor is used to wash the lime-sludge in accordance with the process of this invention in order to reduce the alkali losses in the lime-sludge, the excess weak liquor may be admixed with the black liquor without any additional equipment. In the latter case there is of course a certain additional amount of steam required for evaporating the sulfite waste liquor added to the black liquor.

A preferred embodiment of the invention will now be described with reference to the drawing which is a flowsheet illustrating a continuous process of preparing soda liquor for alkaline cellulose digestion in acordance with this invention starting from a calcium or sodium sulfite waste liquor.

A portion of the fresh sulfite waste liquor is first used to wash the lime-sludge on the lime-sludge filter 1. If the sulfite waste liquor is a calcium sulfite waste liquor its calcium content will be precipitated at this stage and will be discharged from the system together with the lime-sludge. The sulfite waste liquor is thereupon introduced into a mixing vessel 2 where it is mixed with lime-sludge which has previously been treated with the soda liquor obtained by dissolving soda smelt in the sulfite waste liquor, as explained below. The mixture of lime-sludge and sulfite waste liquor is introduced into the clarifier 3 wherefrom the sulfite waste liquor is introduced into the dissolving tank 4 where soda smelt is dissolved in the sulfite waste liquor. The resulting solution or soda liquor passes to a clarifier 5 where it is separated from any sludge formed in the dissolving step. The soda liquor is thereupon used to treat lime-sludge with which it is mixed in the mixer 6 whereupon the soda liquor and the lime-sludge are separated in the clarifier 7 from which the soda liquor is passed to the causticization tank 8 where lime is added to causticize the liquor. The lime-sludge formed thereby is separated from the liquor in the clarifier 9, from which the causticized liquor is withdrawn and taken to the digesters of the alkaline digestion system.

As already explained, the lime-sludge formed in the causticization tank and separated from the liquor in clarifier 9 is mixed with the uncausticized soda liquor in the mixer 6 and separated from the liquor in clarifier 7. From this the lime-sludge is passed to the mixer 2 wherein sulfite waste liquor taken from the filter 1 is introduced. The sludge is separated from the sulfite waste liquor in clarifier 3 and is mixed with any sludge from the clarifier 5 and with a portion of the fresh sulfite waste liquor in the mixer 10 and this mixture is filtered in the filter 1 upon which it is washed with another portion of the fresh sulfite waste liquor as already explained.

The lime-sludge formed in the causticizer 8 is a mixture comprising predominantly (70–95%) calcium carbonate ($CaCO_3$) and also calcium lignosulfonate and, calcium hydroxide ($Ca(OH)_2$) which has not reacted with the sodium carbonate of the soda liquor. The treatment in mixer 6 and clarifier 7 with the soda liquor, i. e., the solution of soda smelt in sulfite waste liquor gives an excess of sodium carbonate which reacts with calcium lignosulfonate and calcium hydroxide to form calcium carbonate and soluble sodium lignosulfonate, and calcium carbonate and sodium hydroxide respectively. After this treatment the lime-sludge contains practically only calcium carbonate, so that it is easily filtered.

The soda smelt may be of the type which is normally obtained by combustion of black liquor in the sulfate cellulose process and may contain about 50–80% $Na_2CO_3$, 15–45% $Na_2S$ the remainder being $Na_2SO_4$, $Na_2S_2O_3$ etc., depending upon the sulfur balance of the sulfate process, the conditions obtaining in combustion of the black liquor and the manner of making up the losses of chemicals in the sulfate plant etc.

Having now particularly described the nature of my invention and the manner of its operation what I claim is:

1. In a process of preparing causticized, sulfide-containing soda liquors for alkaline cellulose digestion, which includes dissolving soda smelt obtained from the alkali regeneration process of the alkaline cellulose system in sulfite waste liquor, causticizing the resulting solution of soda smelt in sulfite waste liquor with lime and separating the resulting causticized soda liquor from lime-sludge formed by the causticization, the steps of treating said separated lime-sludge with a quantity of the uncausticized solution of soda smelt in sulfite waste liquor, washing the lime-sludge treated in this manner with fresh sulfite waste liquor and dissolving a new amount of smelt soda in the sulfite waste liquor, which has been used for washing said lime-sludge.

2. In a process as claimed in claim 1 wherein the sulfite waste liquor is a calcium containing sulfite waste liquor, the steps of precipitating the calcium content of said calcium containing sulfite waste liquor by admixing the sulfite waste liquor with lime-sludge that has been treated with a solution of smelt soda in sulfite waste liquor and still contains such solution and allowing the lime-sludge and the calcium precipitate from the sulfite waste liquor to settle simultaneously.

3. A process as claimed in claim 1, wherein an amount of sulfite waste liquor greater than that required for the dissolution of the smelt soda is used in order to obtain a particularly efficient washing of the lime-sludge and the excess weak liquor thereby obtained is utilized by adding it to black liquor and evaporating and burning it together with said black liquor.

4. In a process as in claim 1 in which the lime-sludge is obtained intermittently in causticizing tanks and the causticized liquor is decanted, the steps of suspending the limie-sludge in a smaller quantity of said solution of smelt soda in sulfite waste liquor and introducing into the tank sulfite waste liquor obtained from washing of the lime-sludge in a subsequent step.

References Cited in the file of this patent

UNITED STATES PATENTS

| 1,834,676 | Bradley et al. | Dec. 1, 1931 |
| 2,552,183 | Knight | May 8, 1951 |